(12) United States Patent
Mital et al.

(10) Patent No.: US 9,140,170 B2
(45) Date of Patent: Sep. 22, 2015

(54) SYSTEM AND METHOD FOR ENHANCING THE PERFORMANCE OF A SELECTIVE CATALYTIC REDUCTION DEVICE

(71) Applicant: GM GLOBAL TECHNOLOGY OPERATIONS LLC, Detroit, MI (US)

(72) Inventors: Rahul Mital, Rochester Hills, MI (US); Jianwen Li, West Bloomfield, MI (US); Justin Adam Shetney, Livonia, MI (US); Chang H. Kim, Rochester, MI (US); Matthew J. Myers, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 14/010,604

(22) Filed: Aug. 27, 2013

(65) Prior Publication Data

US 2015/0059317 A1 Mar. 5, 2015

(51) Int. Cl.
| | |
|---|---|
| *F01N 3/00* | (2006.01) |
| *F01N 11/00* | (2006.01) |
| *F01N 3/20* | (2006.01) |
| *F01N 9/00* | (2006.01) |
| *F01N 3/021* | (2006.01) |

(52) U.S. Cl.
CPC ............. *F01N 11/002* (2013.01); *F01N 3/021* (2013.01); *F01N 3/208* (2013.01); *F01N 9/00* (2013.01); *F01N 2610/02* (2013.01); *F01N 2610/1493* (2013.01); *F01N 2900/1602* (2013.01); *F01N 2900/1812* (2013.01)

(58) Field of Classification Search
CPC ....... F01N 3/208; F01N 3/021; F01N 11/002; F01N 9/00; F01N 2610/02; F01N 2610/1493; F01N 2900/1602; F01N 2900/1812
USPC ..................................................... 60/272–324
See application file for complete search history.

(56) References Cited

U.S. PATENT DOCUMENTS

| | | | |
|---|---|---|---|
| 2011/0030343 A1* | 2/2011 | Kiser et al. ...................... 60/274 |
| 2011/0146254 A1* | 6/2011 | Yi et al. ........................... 60/310 |
| 2014/0245719 A1* | 9/2014 | Mitchell et al. ................. 60/274 |

* cited by examiner

*Primary Examiner* — Thomas Denion
*Assistant Examiner* — Kelsey Stanek
(74) *Attorney, Agent, or Firm* — Quinn Law Group, PLLC

(57) ABSTRACT

A system and method is provided for enhancing the performance of an SCR device, particularly by routinely reducing the amount of reductant deposits accumulated in an exhaust gas system, when the reductant is injected at a reduced temperature. The system may include an engine, an exhaust gas system, an SCR device, an injection device, and a controller configured to execute the present method. The controller may be configured to select an initial injection rate and an initial injection temperature for the reductant; estimate the amount of accumulated reductant deposits present within the exhaust gas system; compare the amount of accumulated reductant deposits to a threshold amount of reductant deposits allowable in the exhaust gas system; and initiate a reductant deposit burn-off mode when the amount of accumulated reductant deposits is greater than the threshold amount of reductant deposits allowable in the exhaust gas system.

20 Claims, 2 Drawing Sheets

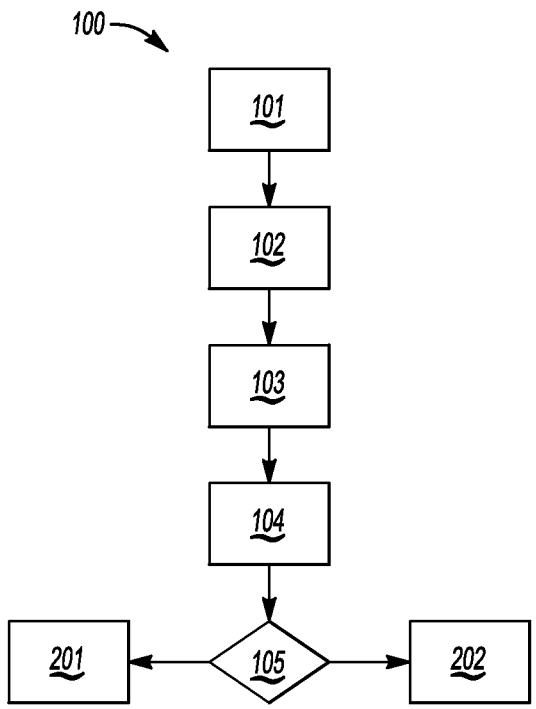
*Fig-2*
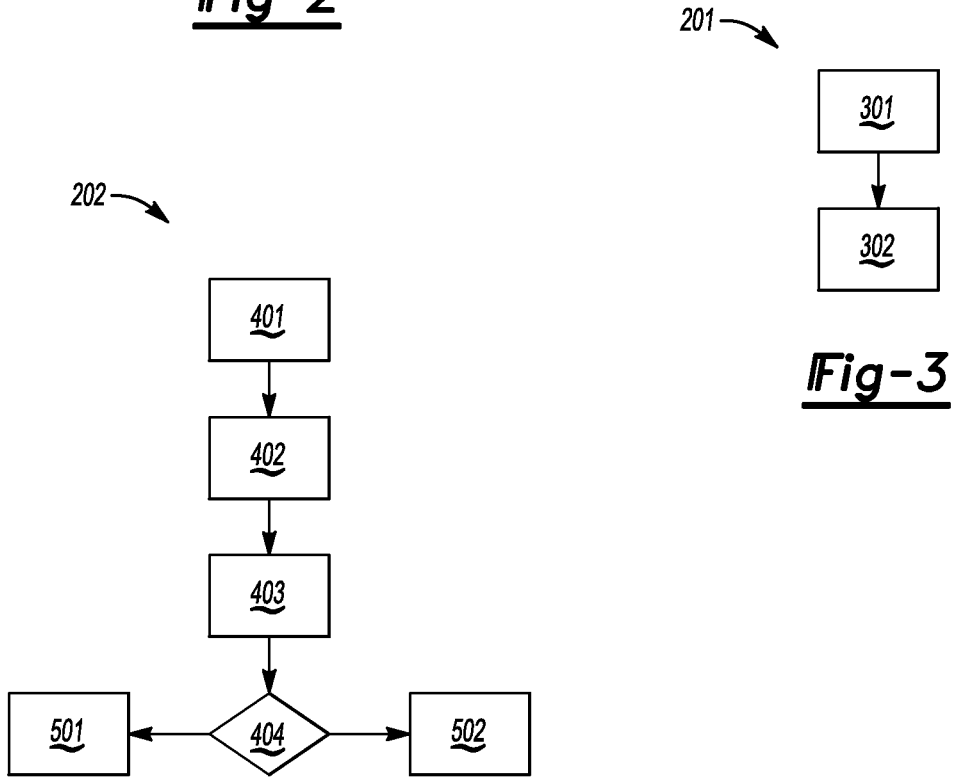
*Fig-3*
*Fig-4*

SYSTEM AND METHOD FOR ENHANCING THE PERFORMANCE OF A SELECTIVE CATALYTIC REDUCTION DEVICE

TECHNICAL FIELD

The present teachings generally include a system and method for improving the performance of a selective catalytic reduction device, particularly by routinely reducing the amount of reductant deposits accumulated in an exhaust gas system, when the reductant is injected at a reduced temperature.

BACKGROUND

An exhaust gas after treatment system for a modern diesel engine exhaust system typically incorporates a selective-catalytic-reduction (SCR) device. The SCR device is utilized to reduce $NO_x$ gases. The SCR device uses a reductant capable of reacting with $NO_x$ gases to convert the $NO_x$ gases into inert byproducts, i.e., nitrogen and water.

For example, the reductant can be an aqueous solution of urea, which is injected into the engine's exhaust stream. Once the reductant is in the exhaust stream, the reductant is absorbed into the SCR device, where the catalytic action of the SCR device ultimately converts $NO_x$ gases into the inert byproducts. Conventionally, urea is injected into the exhaust stream at temperatures above 250° C. to reduce the accumulation of urea deposits within the exhaust gas system.

SUMMARY

A system and method for improving the performance of a selective catalytic reduction (SCR) device, particularly improving the performance of the SCR device by routinely reducing the amount of reductant deposits accumulated in an exhaust gas system, when the reductant is injected at a reduced temperature is provided. The system may include a soot producing engine of a vehicle, which generates an exhaust stream. The system may further include an exhaust gas system in fluid communication with the engine. The system may further include an injection device configured to inject a reductant into the exhaust stream and a selective catalytic reduction (SCR) device configured to catalytically convert nitrogen oxide ($NO_x$) gases present in the exhaust stream into water and nitrogen. The system may further includes a controller configured to execute the present method for improving the performance of a selective catalytic reduction (SCR) device, by routinely reducing the amount of reductant deposits accumulated in an exhaust gas system, when the reductant is injected at a reduced temperature.

The controller may be configured to execute the present method through the following steps. The controller will first select an initial injection rate and an initial injection temperature for a reductant. The controller will then initiate the injection of the reductant into the exhaust gas system via an injection device, wherein the reductant is injected at the initial injection temperature and the initial injection rate. The controller will subsequently estimate, via a reductant deposit module, the amount of instantaneous accumulated reductant deposits present within the exhaust gas system. Resultantly, the controller will compare the amount of accumulated reductant deposits to a predetermined threshold amount of deposits allowable in the exhaust gas system. Finally, the controller will initiate a reductant deposit burn-off mode within the exhaust gas system, when the amount of accumulated reductant deposits is greater than the threshold amount of deposits allowable in the exhaust gas system.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 2 is a flow diagram describing an example method of improving the performance of an SCR device by routinely reducing the amount of reductant deposits accumulated in an exhaust gas system, when the reductant is injected at a reduced temperature;

FIG. 3 is a flow diagram describing a first control action of the example method; and FIG. 4 is a flow diagram describing a second control action of the example method.

DETAILED DESCRIPTION

Figure 1:
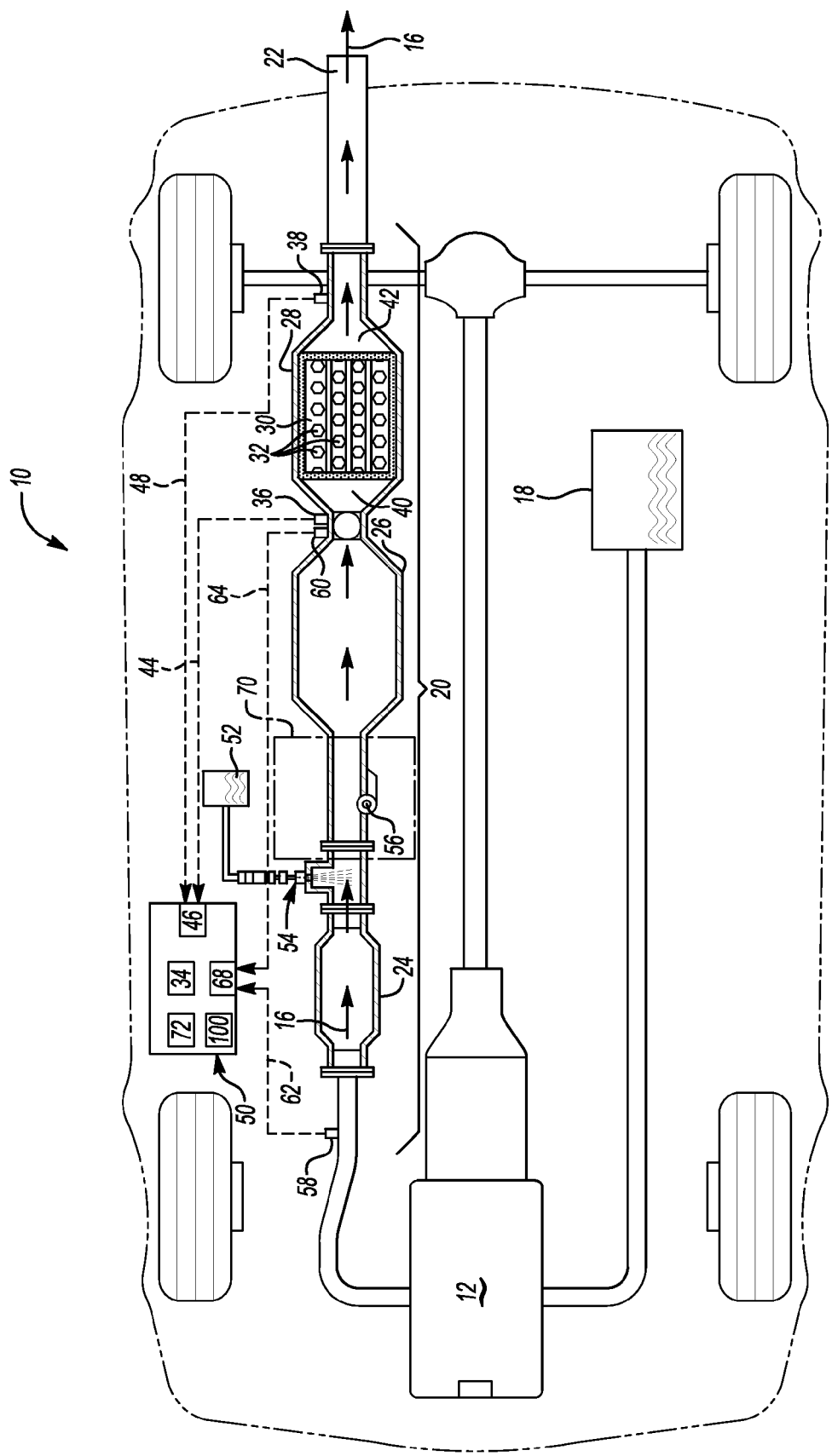
FIG. 1 is a schematic illustration of a vehicle with an engine and an exhaust gas system.

Referring to the drawings, wherein like reference numerals refer to like components throughout the several views, FIG. 1 schematically depicts a vehicle 10. The vehicle 10 includes an internal combustion engine 12, which generates an exhaust stream 16. The vehicle 10 further includes a controller 50 configured, i.e., programmed and equipped in hardware, to regulate and coordinate the functions of various components of the vehicle 10. While a diesel application is described hereinafter for illustrative consistency, those of ordinary skill in the art will appreciate that a similar approach may be taken with respect to other engine designs.

The vehicle 10 includes an exhaust gas system 20 for treating constituents in the exhaust gas stream 16. In other words, the exhaust gas system 20 treats the exhaust stream 16.

As shown in FIG. 1, aboard the vehicle 10, combustion of fuel drawn from a fuel storage tank 18 generates the exhaust stream 16, which is then processed through the exhaust gas system 20 and a tailpipe 22. The exhaust stream 16 is emitted from the engine 12 as a by-product of combustion, and is removed to the ambient through the exhaust gas system 20. The exhaust gas system 20 may include a series of exhaust after-treatment devices, shown as a diesel oxidation catalyst (DOC) 24, selective catalyst reduction (SCR) device 26, and a particulate filter 28.

Accordingly, the exhaust gas system 20 includes a passage for directing the exhaust gas stream 16 from the engine 12 through the series of exhaust gas after-treatment devices 24, 26, 28. Depending on the embodiment, the after-treatment devices 24, 26, 28 of the exhaust gas system 20 may be arranged in any desired order. Collectively, the oxidation catalyst 24, the SCR device 26, and the particulate filter 28 condition the exhaust stream (arrow 16).

The exhaust after-treatment devices 24, 26, 28 are employed to reduce various exhaust emissions of the engine 12. In particular, the diesel oxidation catalyst 24 is adapted to receive the exhaust gas stream 16 from the engine 12 to oxidize and burn hydrocarbons present in the exhaust steam 16. The SCR device 26 is configured to catalytically convert nitrogen oxide ($NO_x$) gases present in the exhaust stream 16 into water and nitrogen. Finally, the particulate filter 28 may be configured to filter particulate matter, i.e., soot, from the exhaust stream 16 of the engine 12. The particulate filter 28 may include one or more substrates 30 that define a plurality of apertures 32 therein, through which the exhaust stream 16 flows. As the exhaust stream 16 passes through the particulate filter 28, suspended airborne particulate matter may collect on the substrate 30, where it may be separated from the exhaust stream 16, i.e., soot loading.

The particulate filter 28 is selectively regenerated to remove the collected particulate matter. Regeneration of the particulate filter 28 occurs during a specified regeneration event, which includes heating the particulate filter 28 to a temperature sufficient to burn the collected particulate matter or soot, which converts the particulate matter to carbon dioxide. A particulate filter regeneration event is commonly dictated by the presence of a predetermined amount of sooty particulate matter accumulated in the particulate filter 28 in excess of a predetermined soot threshold.

Soot accumulation or soot loading may be estimated via the controller 50, through the selection of an evaluation element 34. The evaluation element 34 may be one of measured differential pressure of the particulate filter 28, a time since a regeneration of the particulate filter 28, a distance traveled by the vehicle 10 since a regeneration event of the particulate filter 28, and an amount of fuel burned by the engine 12 since a regeneration event of the particulate filter 28.

When the evaluation element 34 is the measured differential pressure of the particulate filter 28, the measured differential pressure is the instantaneous pressure drop across the particulate filter 28. The instantaneous pressure drop across the particulate filter 28, or the differential pressure ($\Delta P$), is evaluated via at least one differential pressure sensor 36, 38. Accordingly, the exhaust gas system 20 may further include a first pressure sensor 36 and a second pressure sensor 38. The first pressure sensor 36 may be disposed at an inlet side 40 of the particulate filter 28 between the particulate filter 28 and the SCR device 26. The exhaust gas system 20 may further include a second pressure sensor 38 disposed at an outlet side 42 of the particulate filter 28.

The first pressure sensor 36 may be configured to transmit a first pressure reading (arrow 44) to a differential pressure module 46, and the second sensor 38 may be configured to transmit a second pressure reading (arrow 48) to the differential pressure module 46.

The differential pressure module 46 may be in communication with the first pressure sensor 36 and the second pressure sensor 38. The differential pressure module 46 may be written on the tangible non-transitory memory of the controller 50. The differential pressure module 46 may further be configured to determine the difference between the first pressure reading 44 and the second pressure reading 48 and generate a delta pressure output corresponding to a pressure drop across the particulate filter 28 between the first pressure sensor 36 and the second pressure sensor 38.

Each of the first pressure sensor 36 and the second pressure sensor 38 may be a unitary sensor or gauge connected to the particulate filter 28. The first and second pressure sensors 36, 38 may be embodied as a pair of pressure taps that individually read inlet and outlet pressures and calculate the differential pressure, $\Delta P$, across the particulate filter 28, as shown, or alternatively as a signal sensor capable of returning a resultant $\Delta P$ measurement to the controller 50.

In one example, shown in FIG. 1, following the DOC 24, the exhaust gas stream 16 is routed to the SCR device 26. In other words, the SCR device 26 is disposed downstream of the DOC 24. The SCR device 26 is utilized to reduce $NO_x$ gases in the exhaust stream 16.

The SCR device 26 includes an active catalytic component, which can be an oxide of a base metal such as one of vanadium, molybdenum, tungsten, and zeolite. A reductant 52 is injected into the exhaust stream 16 and utilized to convert $NO_x$ gases into inert byproducts within the SCR device 26. The reductant 52 is injected into the SCR device 26 within the exhaust gas system 20 via a dosing module or injector 54. The reductant 52 is atomized with the exhaust stream 16 utilizing a mixer 56. As such, the SCR device 26 converts $NO_x$ gases, with the aid of the reductant 52, into inert byproducts, i.e., diatomic nitrogen $N_2$, and water $H_2O$.

The reductant 52 can be an anhydrous ammonia, aqueous ammonia, ammonia precursors, aqueous solution of urea or any other suitable reductant 52, which is added to the exhaust stream 16 and absorbed in the SCR device 26. Accordingly, the reductant 52 accesses the SCR device 26 as the exhaust gas stream 16, flows through SCR device 26. As the exhaust stream 16 passes through the SCR device 26, the reductant 52 interacts with the exhaust gas stream 16 via a chemical reaction, to reduce $NO_x$ gases present in the exhaust gas stream 16 as it passes through the exhaust gas system 20.

The exhaust gas system 20 may further include a plurality of $NO_x$ sensors 58, 60, namely a first $NO_x$ sensor 58 and a second $NO_x$ sensor 60, which may be configured to detect the amount of $NO_x$ gases present in the exhaust stream 16 at various points within the exhaust gas system 20.

A first $NO_x$ sensor 58 may be positioned upstream with respect to the SCR device 26, such as at the outlet of the engine 12. Thus, the $NO_x$ sensor 58 may be referred to hereinafter as the upstream $NO_x$ sensor 58. The first $NO_x$ sensor 58 measures the amount of $NO_x$ gases present in the exhaust stream 16 just after combustion.

A second $NO_x$ sensor 60 may be positioned downstream with respect to the SCR device 26; for instance, just before the DPF 28 as shown in FIG. 1. Thus, the $NO_x$ sensor 60 may be referred to hereinafter as the downstream $NO_x$ sensor 60. The second $NO_x$ sensor 60 measures the amount of $NO_x$ gases present in the exhaust stream 16 after the exhaust stream 16 is treated with the reductant 52 and has passed through the SCR device 26 designed to convert $NO_x$ gases, with the aid of the reductant 52 into inert byproducts, i.e., diatomic nitrogen $N_2$, and water $H_2O$.

Structurally and functionally, the $NO_x$ sensors 58 and 60 may be otherwise identical. Each $NO_x$ sensor 58, 60 returns an output $NO_x$ level measurement (arrows 62, 64) to a $NO_x$ conversion efficiency module 68. The $NO_x$ conversion efficiency module may be written on the tangible non-transitory memory of the controller 50. The $NO_x$ conversion efficiency module 68 is configured to determine the $NO_x$ conversion efficiency of the exhaust gas system 20 based on a comparison of the $NO_x$ level measurements of each of the respective NOx sensors 58, 60.

Conventionally, the reductant 52 is injected in the exhaust stream 16 at temperatures above 200° C. to reduce the accumulation of reductant deposits within the exhaust gas system 20. Such reductant deposits commonly accumulate within a deposit accumulation zone shown in FIG. 1 at 70, for example, at the injector 54, at the mixer 56, and/or downstream thereof. The accumulation of reductant deposits may increase as the reductant 52 is injected closer in time to the start-up of the engine 12 and at reduced exhaust gas system 20 temperatures. The accumulation of reductant deposits may reduce long-term catalytic performance of the SCR device 26 and the overall exhaust gas system 20.

However, injecting the reductant 52 at lower exhaust gas system 20 temperatures and loading the SCR device 26 with a higher reductant 52 dosage can benefit and improve the $NO_x$ conversion efficiency of the exhaust gas system 20, absent the accumulation of reductant deposits.

The accumulation of such reductant deposits may be estimated via a reductant deposit module 72. The reductant deposit module 72 may be a three dimensional look-up table look-up table expressing the accumulation of reductant deposits based on each of the initial injection temperature, the initial injection rate, and an exhaust flow rate through the exhaust gas system. The reductant deposit module 72 may be written on the tangible non-transitory memory of the controller 50.

Referring back to the controller 50 described herein above, the controller 50 may be a stand-alone unit, or be part of an electronic controller that regulates the operation of the engine 12. The controller 50 may be embodied as a sever/host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 50 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

Therefore, the controller 50 can include all software, hardware, memory, algorithms, connections, sensors, etc., necessary to monitor and control the exhaust gas system 20 and the engine 12. As envisioned herein, the controller 50 may be an electronic control unit (ECU) that is configured, i.e. programmed and equipped in hardware, to regulate and coordinate the functions of the various components of the vehicle 10 as well as receive input signals based on a plurality of selections from a user, such as a calibrator or programmer of the vehicle 10. The controller 50 is in electrical communication with various components of the vehicle 10, such as the first and second $NO_x$ sensors 58, 60, the SCR device 26, and the particulate filter 28. The controller 50 may also control the engine 12 and the regeneration cycle of the particulate filter 28, based on the evaluation element 34 and outputs from the reductant deposit module 72, the $NO_x$ conversion efficiency module 68, and various other sensed information.

In general, computing systems and/or devices, such as the controller 50, may employ any of a number of computer operating systems and generally include computer-executable instructions, where the instructions may be executable by one or more computing devices such as those listed above. Computer-executable instructions may be compiled or interpreted from computer programs created using a variety of well-known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

The controller 50 may be configured to execute the present method 100 to enhance the performance of the SCR device 26, particularly by routinely reducing the amount of reductant deposits accumulated in the exhaust gas system 20, when the reductant 52 is injected at a reduced exhaust gas system 20 temperature. The pre-recorded, computer-executable instructions that define the present method 100 may be written on a tangible, non-transitory memory of the controller 50.

As shown in FIG. 2, the present method 100 of improving the performance of an SCR device 26 may include three steps. Simply stated, the present method 100 enhances the performance of the SCR device 26 by routinely reducing the amount of reductant deposits accumulated in an exhaust gas system 20, when the reductant 52 is injected at a reduced exhaust gas system 20 temperature. At step 101, the controller 50 selects an initial injection rate and an initial injection temperature for the reductant 52. The initial injection temperature is defined as the temperature of the exhaust gas system 20 when reductant injection or urea dosing is initiated. Each of the initial injection rate and the initial injection temperature may each be a predetermined and calibrated parameter that is input into the controller 50 by a programmer or calibrator. For example, the initial injection temperature is intended to be reduced as allowed by the hardware to enhance the performance of the SCR device 26 and increase loading of the reductant on the SCR device 26. The initial injection temperature may range from about 150° C. to about 250° C.

At step 102, the controller 50 initiates the injection of the reductant 52 at the selected initial injection rate, when the initial injection temperature is reached. The reductant 52 is injected or dosed into the exhaust stream 16 with the dosing module or injection device 54 (shown in FIG. 1). The reductant 52 is then atomized with the exhaust stream 16 utilizing the mixer 56.

At step 103, the amount of accumulated reductant deposits is estimated by a reductant deposit module 72, written on the tangible on-transitory memory of the controller 50. The reductant deposit module 72 estimates the instantaneous amount of accumulated reductant deposits present within the exhaust gas system 20, based on the initial injection rate, the initial injection temperature, and the exhaust flow rate through the exhaust gas system 20.

At step 104, the controller 50 compares the amount of accumulated reductant deposits, estimated by the reductant deposit module 72, to a predetermined threshold amount of deposits allowable in the exhaust gas system 20. The threshold amount of deposits allowable in the exhaust gas system 20 is a predetermined and calibrated threshold parameter that is input into the controller 50 by a programmer or calibrator and written on the tangible non-transitory memory of the controller 50. The threshold amount of deposits allowable in the exhaust gas system 20 is dependent upon the exhaust gas system layout and a target $NO_x$ conversion efficiency. The threshold amount of deposits allowable in the exhaust gas system 20 is intended to be less than 5% and may be targeted to be less than 1% of the amount of reductant 52 injected into the exhaust gas system 20, i.e., the reductant dosing quantity.

At step 105, the controller 50, executes, one of a first control action 201 and a second control action 202. The controller 50 executes a first control action 201, when the amount of accumulated reductant deposits is less than the threshold amount of deposits allowable in the exhaust gas system 20. The controller 50 executes a second control action 202, when the amount of accumulated reductant deposits is greater than the threshold amount of deposits allowable in the exhaust gas system 20.

As shown in FIG. 3, the first control action 201 may include two steps. At step 301, the controller 50 continuously compares, i.e., compares once per control loop, the instantaneous amount of accumulated reductant deposits, estimated by the reductant deposit module 72, to the threshold amount of deposits allowable in the exhaust gas system 20, until the amount of accumulated reductant deposits is equal to or greater than the threshold amount of deposits allowable in the exhaust gas system 20.

Simply stated, the controller 50 performs a loop-type function, during which the controller 50 continuously compares estimations from the reductant deposit module 72 to the threshold amount of deposits allowable in the exhaust gas system 20, until the amount of deposits accumulated meets and/or exceeds the threshold amount of deposits allowable in the exhaust gas system 20.

At step 302, the controller 50 initiates the second control action 202. The second control action 202 is initiated, when the amount of accumulated reductant deposits is equal to or greater than the threshold amount of deposits allowable in the exhaust gas system 20, i.e., when the reductant deposits require elimination and/or reduction.

As shown in FIG. 4, the second control action 202 may include four steps. The second control action 202, sets forth a method for removing or burning off accumulated reductant deposits that exceed the threshold amount of deposits allowable in the exhaust gas system 20. Deposits may be removed from the exhaust gas system 20 via an independent burn-off mode or in conjunction with a particulate filter regeneration event.

At step 401, the controller 50 selects an evaluation element 34, wherein the evaluation element 34 is the maximum variable of one of measured differential pressure of the particulate filter 28, a time since a regeneration of the particulate filter 28, a distance traveled by the vehicle 10 since a regeneration event of the particulate filter 28, and an amount of fuel burned by the engine 12 since a regeneration event of the particulate filter 28.

At step 402, the controller 50 estimates an amount of soot accumulated in the particulate filter 28 based on the evaluation element 34.

At step 403, the controller 50 compares the amount of soot accumulated, as estimated in step 402, to a predetermined threshold amount of soot allowable in the particulate filter 28. The threshold amount of soot allowable in the particulate filter 28 may be a predetermined and calibrated parameter input into the controller 50 by a programmer or calibrator and subsequently written on the tangible non-transitory memory of the controller 50. The threshold amount of soot allowable in the particulate filter 28 may be defined as a percentage of the maximum soot level of the particulate filter and/or a percentage of overall soot loading. In one example, the threshold amount of soot allowable in the particulate filter 28 may be defined as greater than 50% of the maximum soot level. In another example, the threshold amount of soot allowable in the particulate filter 28 may be defined as greater than 90% of the maximum soot level.

At step 404, the controller 50 executes one of a third control action 501 and a fourth control action 502. The controller 50 executes the third control action 501, when the amount of soot accumulated is less than the threshold amount of soot allowable in the particulate filter 28. The controller 50 executes the fourth control action 502, when the amount of soot accumulated is equal to and/or greater than the threshold amount of soot allowable in the particulate filter 28.

Each of the third control action 501 and the fourth control action 502 include initiating, with the controller 50, a reductant deposit burn-off mode, in order to reduce or eliminate reductant deposits present in the exhaust gas system 20. The reductant deposit burn-off mode comprises an exposure of the accumulated reductant deposits to an exhaust gas system cleaning temperature, the exhaust gas cleaning temperature being a temperature of the exhaust gas system 20 sufficient to reduce the accumulated reductant deposits injected at the initial injection temperature.

The third control action 501 is initiated by the controller 50, when the amount of soot accumulated is less than the threshold amount of soot allowable in the particulate filter 28, i.e., a particulate filter regeneration event is not desired. The third control action 501, resultantly, initiates the reductant deposit burn-off mode as an independent cycle, wherein the only desired function of the cycle is to reduce or eliminate accumulated reductant deposits within the exhaust gas system 20.

The fourth control action 502 is initiated by the controller 50, when the amount of soot accumulated is equal to and/or greater than the threshold amount of soot allowable in the particulate filter 28, i.e., a particulate filter regeneration event is desired within the exhaust gas system 20 to remove or burn-off the collected particulate matter or soot from within the particulate filter 28. When a particulate filter regeneration event is desired, the reductant deposit burn-off mode may be initiated in conjunction with the particulate filter regeneration event. Thus, the fourth control action 502 includes initiating, with the controller 50, the reductant deposit burn-off mode within the exhaust gas system 20 in conjunction with a scheduled particulate filter regeneration event. Initiating the reductant deposit burn-off mode in conjunction with the particulate filter regeneration event provides a fuel economy benefit to the vehicle 10.

The reductant deposit burn-off mode comprises an exposure of the accumulated reductant deposits to an exhaust gas system cleaning temperature, which corresponds to the initial injection temperature. The exhaust gas system cleaning temperature is a temperature of the exhaust gas system 20 sufficient to reduce the accumulated reductant deposits formed as a result of reductant 52 injected at the initial injection temperature. The predetermined exhaust gas system cleaning temperature is generally less than 700° C., as temperatures in excess thereof may reduce the efficiency and effect of the SCR device 26.

The exhaust gas system cleaning temperature increases proportionally with the initial injection temperature. For example, if reductant 52 is injected at an initial injection temperature of approximately 150° C. and a reductant deposit is subsequently formed as a result thereof, the exhaust gas system cleaning temperature may range from about 400° C. to about 700° C. In another example, if the reductant 52 is injected at approximately 200° C. and a reductant deposit is subsequently formed as a result thereof, the exhaust gas system cleaning temperature may range from about 500° C. to about 700° C. In yet another example, if the reductant 52 is injected at approximately 250° C. and a reductant deposit is subsequently formed as a result thereof, the exhaust gas system cleaning temperature may range from about 600° C. to about 700° C. Deposits are cleaned and/or removed more quickly when exposed to cleaning temperatures at the high end of each of the respective ranges.

Further, reductant deposits formed at high initial injection temperatures may still be reduced through exposure to the reductant 52 subsequently injected at a secondary injection temperature, when the secondary injection temperature is lower than the initial injection temperature of the initially formed accumulated reductant deposits. The reductant 52 injected at the secondary injection temperature forms a film over the amount of accumulated reductant deposits formed at the initial injection temperature. The accumulated reductant deposits having the film formed thereon define an aggregate reductant deposit nucleation site. Such an aggregate reductant deposit nucleation site may be reduced and/or removed from the exhaust gas system 20 through the initiation of the reductant deposit burn-off mode, which maintains an exhaust gas system cleaning temperature sufficient to burn-off the film formed as a result of injection of the reductant 52 at the secondary injection temperature.

The ability to routinely reduce and/or remove accumulated reductant deposits from the exhaust gas system 20, allows for reductant injection and dosing at lower initial exhaust gas system temperatures. Injection at lower initial exhaust gas system temperatures enhances the performance of the SCR device 26 and the $NO_x$ conversion efficiency of the system, as $NO_x$ reduction may begin closer in time to engine 12 start-up.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of improving the performance of a selective catalytic reduction (SCR) device of a vehicle having an engine and an exhaust gas system, the method comprising:
   selecting, via a controller, an initial injection rate and an initial injection temperature for a reductant, the initial injection temperature defined as the temperature of the exhaust gas system when the reductant is injected;
   initiating, via the controller, an injection of the reductant into the exhaust gas system via an injection device, including injecting the reductant at the initial injection temperature and the initial injection rate;
   estimating, via a reductant deposit module, an instantaneous amount of accumulated reductant deposits present within the exhaust gas system based on each of the initial injection rate, the initial injection temperature, and an exhaust flow rate through the exhaust gas system;
   comparing, with the controller, the amount of accumulated reductant deposits to a threshold amount of deposits allowable in the exhaust gas system;
   executing, via the controller, a first control action when the amount of accumulated reductant deposits is less than the threshold amount of deposits allowable in the exhaust gas system and a second control action when the amount of accumulated reductant deposits is greater than the threshold amount of deposits allowable in the exhaust gas system;
   wherein the first control action includes repeatedly comparing, via the controller, the amount of accumulated reductant deposits to the threshold amount of deposits allowable in the exhaust gas system until the amount of accumulated reductant deposits is equal to the threshold amount of deposits allowable in the exhaust gas system and initiating the second control action when the amount of accumulated reductant deposits is equal to the threshold amount of deposits allowable in the exhaust gas system; and
   wherein the second control action includes evaluating, via the controller, an amount of soot accumulated in a particulate filter of the exhaust gas system and initiating a reductant deposit burn-off mode within the exhaust gas system, wherein the reductant deposit burn-off mode is defined as an exposure of the accumulated reductant deposits to an exhaust gas system cleaning temperature, such that the exhaust gas cleaning temperature is a temperature of the exhaust gas system sufficient to burn off the accumulated reductant deposits.

2. The method of claim 1 wherein evaluating the amount of soot accumulated in a particulate filter of the exhaust gas system includes:
   selecting, via the controller, an evaluation element, wherein the evaluation element is one of a measured differential pressure of a particulate filter, a time since a regeneration event of the particulate filter, a distance traveled by the vehicle since a regeneration event of the particulate filter, and an amount of fuel burned by the engine since a regeneration event of the particulate filter;
   estimating, via the controller, an amount of soot accumulated in the particulate filter based on the evaluation element;
   comparing, via the controller, the amount of soot accumulated in the particulate filter to a threshold amount of soot allowable in the particulate filter;
   executing a third control action when the amount of soot accumulated is less than the threshold amount of soot allowable in the particulate filter and a fourth control action when the amount of soot accumulated is greater than the threshold amount of soot allowable in the particulate filter.

3. The method of claim 2 wherein the measured differential pressure is the instantaneous differential pressure measured across the particulate filter.

4. The method of claim 3 wherein the particulate filter has a predetermined maximum soot level; and wherein the threshold amount of soot allowable in the particulate filter is 90% of the predetermined maximum soot level.

5. The method of claim 2 wherein the third control action includes
   initiating, with the controller, a reductant deposit burn-off mode within the exhaust gas system independent of a scheduled particulate filter regeneration event.

6. The method of claim 2 wherein the fourth control action includes:
   initiating, with the controller, a reductant deposit burn-off mode within the exhaust gas system in conjunction with a scheduled particulate filter regeneration event.

7. The method of claim 1 wherein the exhaust gas cleaning temperature increases proportionally with an increase in the initial injection temperature.

8. The method of claim 7 wherein the initial injection temperature is from about 150° C. to about 250° C.

9. The method of claim 8 wherein the initial injection temperature is from about 150° C. to about 180° C.

10. A method of improving the function and performance of a selective catalytic reduction (SCR) device of a vehicle having an engine and an exhaust gas system, the method comprising:
    selecting, via a controller, an initial injection rate and an initial injection temperature for a reductant, the initial injection temperature defined as the temperature of the exhaust gas system when the reductant is injected;
    initiating, via the controller, an injection of the reductant into the exhaust gas system via an injection device, including injecting the reductant at the initial injection temperature and the initial injection rate with the injection device;
    estimating, via a reductant deposit module, an instantaneous amount of accumulated reductant deposits present within the exhaust gas system based on each of the initial injection rate, the initial injection temperature, and an exhaust flow rate through the exhaust gas system;
    comparing, with the controller, the amount of accumulated reductant deposits to a threshold amount of deposits allowable in the exhaust gas system;
    executing, via the controller, a first control action when the amount of accumulated reductant deposits is less than the threshold amount of deposits allowable in the exhaust gas system and a second control action when the amount of accumulated reductant deposits is greater than the threshold amount of deposits allowable in the exhaust gas system;

wherein the first control action includes repeatedly comparing, via the controller, the amount of accumulated reductant deposits to the threshold amount of deposits allowable in the exhaust gas system until the amount of accumulated reductant deposits is equal to the threshold amount of deposits allowable in the exhaust gas system and initiating the second control action when the amount of accumulated reductant deposits is equal to the threshold amount of deposits allowable in the exhaust gas system; and wherein the second control action includes:
  initiating, with the controller, the injection of the reductant into the exhaust gas system via the injection device, including injecting the reductant at a secondary injection temperature and a secondary injection rate, to form a film on the accumulated amount of reductant deposits, thereby defining an aggregate reductant deposit nucleation site; and
  initiating, with the controller, a reductant deposit burn-off mode within the exhaust gas system, wherein the reductant deposit burn-off mode is defined as an exposure of the aggregate reductant deposit nucleation site to an exhaust gas cleaning temperature sufficient to burn-off the aggregate reductant deposit nucleation site.

11. The method of claim 10 wherein the exhaust gas cleaning temperature sufficient to burn-off the aggregate reductant deposit nucleation site is the exhaust gas cleaning temperature sufficient to burn-off the film.

12. The method of claim 11 wherein the secondary injection temperature is less than the initial injection temperature, and wherein the exhaust gas cleaning temperature increases proportionally with an increase in the secondary injection temperature.

13. A system for improving the performance of a selective catalytic reduction (SCR) device of a vehicle, the system comprising:
  an engine that generates an exhaust stream;
  an exhaust gas system in fluid communication with the engine, wherein the exhaust gas system includes:
    an injection device configured to inject a reductant into the exhaust stream;
    a selective catalytic reduction (SCR) device configured to catalytically convert nitrogen oxide ($NO_x$) gases present in the exhaust stream into water and nitrogen;
    a particulate filter configured to remove particulate matter from the exhaust stream; and
  a controller, having a processor and tangible, non-transitory memory on which is recorded instructions, wherein executing the recorded instructions causes the processor to:
    select an initial injection rate and an initial injection temperature for a reductant, the initial injection temperature defined as the temperature of the exhaust gas system when the reductant is injected;
    initiate the injection of the reductant into the exhaust gas system, via an injection device, wherein the reductant is injected at the initial injection temperature and the initial injection rate;
    estimate, with a reductant deposit module, an amount of instantaneous accumulated reductant deposits present within the exhaust gas system, based on each of the initial injection rate, initial injection temperature, and an exhaust flow rate through the exhaust gas system;
    compare the amount of accumulated reductant deposits to a threshold amount of deposits allowable in the exhaust gas system; and
    initiate a reductant deposit burn-off mode within the exhaust gas system, wherein the reductant deposit burn-off mode is defined as an exposure of the accumulated reductant deposits to an exhaust gas system cleaning temperature, such that the exhaust gas cleaning temperature is a temperature of the exhaust gas system sufficient to burn off the accumulated reductant deposits.

14. The system of claim 13 wherein the exhaust gas cleaning temperature increases proportionally with the increase of the initial injection temperature.

15. The system of claim 14 wherein the initial injection temperature is from about 150° C. to about 250° C.

16. The system of claim 15 wherein the initial injection temperature is from about 150° C. to about 180° C.

17. The method of claim 2 wherein initiating the reductant deposit burn-off mode within the exhaust gas system further includes:
  initiating, with the controller, the injection of the reductant into the exhaust gas system via the injection device, including injecting the reductant at a secondary injection temperature and a secondary injection rate, to form a film on the accumulated amount of reductant deposits, thereby defining an aggregate reductant deposit nucleation site; and
  wherein the reductant deposit burn-off mode is further defined as an exposure of the aggregate reductant deposit nucleation site to an exhaust gas cleaning temperature sufficient to burn-off the aggregate reductant deposit nucleation site, wherein the exhaust gas cleaning temperature sufficient to burn-off the aggregate reductant deposit nucleation site is the exhaust gas cleaning temperature sufficient to burn-off the film.

18. The method of claim 17 wherein the secondary injection rate is less than the initial injection rate, and wherein the exhaust gas cleaning temperature increases proportionally with an increase in the secondary injection temperature.

19. The system of claim 13 wherein the initiating the reductant deposit burn-off mode within the exhaust gas system further includes:
  initiating, with the controller, the injection of the reductant into the exhaust gas system via the injection device, including injecting the reductant at a secondary injection temperature and a secondary injection rate, to form a film on the accumulated amount of reductant deposits, thereby defining an aggregate reductant deposit nucleation site; and
  wherein the reductant deposit burn-off mode is further defined as an exposure of the aggregate reductant deposit nucleation site to an exhaust gas cleaning temperature sufficient to burn-off the aggregate reductant deposit nucleation site, such the exhaust gas cleaning temperature sufficient to burn-off the aggregate reductant deposit nucleation site is the exhaust gas cleaning temperature sufficient to burn-off the film.

20. The method of claim 19 wherein the secondary injection rate is less than the initial injection rate, and wherein the exhaust gas cleaning temperature increases proportionally with an increase in the secondary injection temperature.

* * * * *